(12) United States Patent
Watanabe

(10) Patent No.: US 7,146,469 B2
(45) Date of Patent: Dec. 5, 2006

(54) METHOD, APPARATUS, AND SYSTEM FOR IMPROVING MEMORY ACCESS SPEED

(75) Inventor: Hidekazu Watanabe, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 281 days.

(21) Appl. No.: 10/279,500

(22) Filed: Oct. 24, 2002

(65) Prior Publication Data

US 2004/0083344 A1 Apr. 29, 2004

(51) Int. Cl.
*G06F 12/06* (2006.01)
(52) U.S. Cl. .................. 711/141; 711/154; 711/218
(58) Field of Classification Search ............... 711/154, 711/217, 218
See application file for complete search history.

(56) References Cited

U.S. PATENT DOCUMENTS

| 5,345,573 | A | * | 9/1994 | Bowden et al. | 711/217 |
|---|---|---|---|---|---|
| 5,526,513 | A | * | 6/1996 | Cerutti | 711/169 |
| 5,559,990 | A | * | 9/1996 | Cheng et al. | 711/157 |
| 5,634,104 | A | * | 5/1997 | Maki | 711/3 |
| 5,696,917 | A | * | 12/1997 | Mills et al. | 711/1 |
| 6,360,308 | B1 | * | 3/2002 | Fechser | 711/218 |
| 6,457,075 | B1 | * | 9/2002 | Koutsoures | 710/35 |

OTHER PUBLICATIONS

An overview of logic architectures inside flash memory devices Silvagni, A.; Fusillo, G.; Ravasio, R.; Picca, M.; Zanardi, S.; Proceedings of the IEEE , vol. 91 , Issue: 4 , Apr. 2003 pp. 569-580.*
Speeding up the memory hierarchy in Flat COMA multiprocessors Yang, L.; Torrellas, J.; High-Performance Computer Architecture, 1997., Third International Symposium on , Feb. 1-5, 1997 pp. 4-13.*

* cited by examiner

Primary Examiner—Brian R. Peugh
(74) Attorney, Agent, or Firm—Blakely, Sokoloff, Taylor & Zafman LLP

(57) ABSTRACT

According to one embodiment of the invention, an apparatus comprises a high speed memory unit, a memory controller and an external bus interface (EBIF) unit coupled to the memory controller. The EBIF unit, based on a memory request issued by a host device to read a block of data from an external memory device, (i) initiates a burst or page mode read cycle independent of whether the memory request is associated with consecutive memory accesses to the external memory device, (ii) stores the block of data read in the high speed memory unit in response to the burse or page mode read cycle, and (iii) retrieves requested data from the high speed memory unit in response to a subsequent, non-consecutive memory request issued by the host device for data already stored within the high speed memory unit.

22 Claims, 8 Drawing Sheets

US 7,146,469 B2

METHOD, APPARATUS, AND SYSTEM FOR IMPROVING MEMORY ACCESS SPEED

FIELD

An embodiment of the invention relates to the field of processor, memory, and data transfer technologies including memory operations and memory interface, and more specifically, relates to a method, apparatus, and system for improving memory access speed in computer systems.

BACKGROUND

In recent years, computer systems' performance and capabilities have continued to advance rapidly in light of various technological advances and improvements with respect to processor architecture and performance. In particular, central processing unit (CPU) speed has continued to improve significantly in the past several years. However, memory access speed has not improved as much compared with the CPU speed. Consequently, CPU operations and performance can be limited by memory access speed. To improve this situation, some CPUs employ high access speed memory (e.g., cache memory) to store some part of main memory (also called system memory) in order to improve memory access efficiency. Typically a CPU may need a cache memory having a size larger than 4 kbytes (KB) with high access speed to be located near the CPU. Such a cache memory is typically expensive and tends to require complicated design cache or memory controller circuit. Consequently, the use of such cache memory may negatively impact the CPU design itself and the overall cost of the CPU. Accordingly, there exists a need to improve CPU memory access efficiency without large size of high speed memory (cache) or complicated memory controller design.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following detailed description numerous specific details are set forth. However, it is understood that embodiments of the invention may be practiced without these specific details.

As mentioned above, in order to improve memory access efficiency, some CPUs have employed high access speed memory (e.g., cache memory) which is located near the CPU to store some part of main memory (also called system memory). However, such a cache memory is typically expensive and requires complicated design cache or memory controller circuit. Thus, the use of such cache memory may negatively impact the CPU design itself and the overall cost of the CPU.

According to one embodiment of the invention, the CPU memory access efficiency can be improved without using large size and high cost cache memory and/or complicated memory controller circuit. In one embodiment, the CPU memory access efficiency is achieved by implementing a high speed and small-size temporary memory unit to store data received from an external memory device which has slower memory access speed compared to the temporary memory unit. The high speed temporary memory unit is accessed via a memory controller which is coupled to an external bus interface (EBIF) unit. The EBIF is configured to control and facilitate memory accesses between a host device (e.g., a CPU) and the high speed temporary memory unit to reduce memory access time (also called memory access latency) for the host device. The structure and operations of these components are described in greater detail below.

Figure 1:
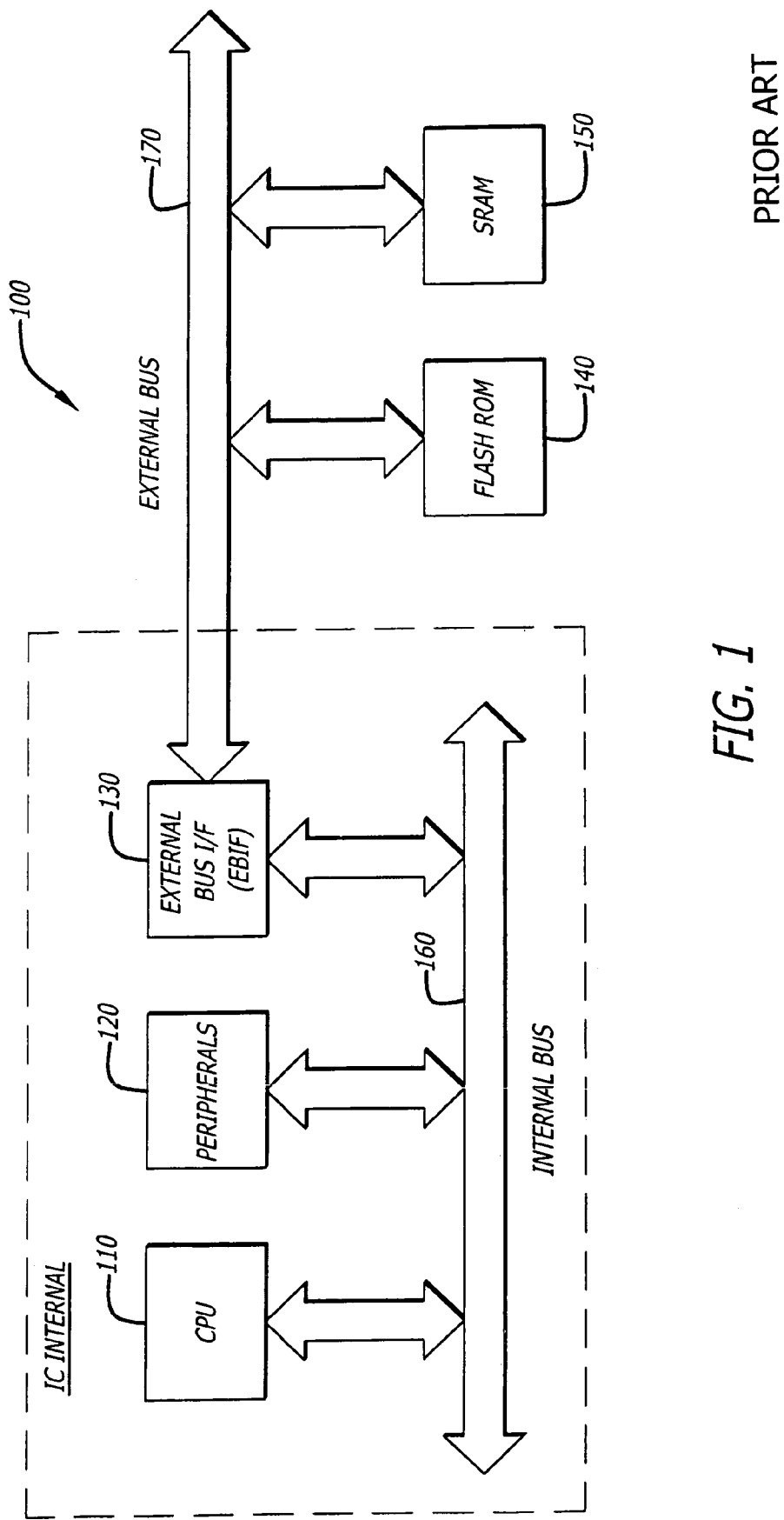
FIG. 1 shows a block diagram of a system configuration with external memory.

FIG. 1 shows a block diagram of a computer system configuration 100 which includes a CPU 110, one or peripheral devices 120, external bus interface (EBIF) 130, one or more Flash ROM devices 140 and system memory (e.g., SRAMs) 150. The CPU 110 and other modules such as peripheral devices 120 may be stand-alone units or be parts of integrated circuit (IC) chip. As shown in FIG. 1, the CPU 110, the peripheral devices 120, and the EBIF are typically connected via an internal bus 160. The memory devices such as the Flash ROM 140 and the SRAM 150 are coupled to the EBIF 130 via an external bus 170. In general, the CPU 110 accesses the memory devices (e.g., Flash ROM 140 and SRAM 150) via the EBIF 130. For example, a program may be stored on the Flash ROM 140 and the CPU 110 can read the program from the Flash ROM 140 and execute it. As mentioned above, the speed of a memory device such as the Flash ROM 140 is much slower compared to that of the CPU 110. As a result, the CPU's performance can be significantly limited by the slow speed of the Flash ROM 140 when it needs data from the Flash ROM 140 to perform its corresponding functions.

Figure 2:
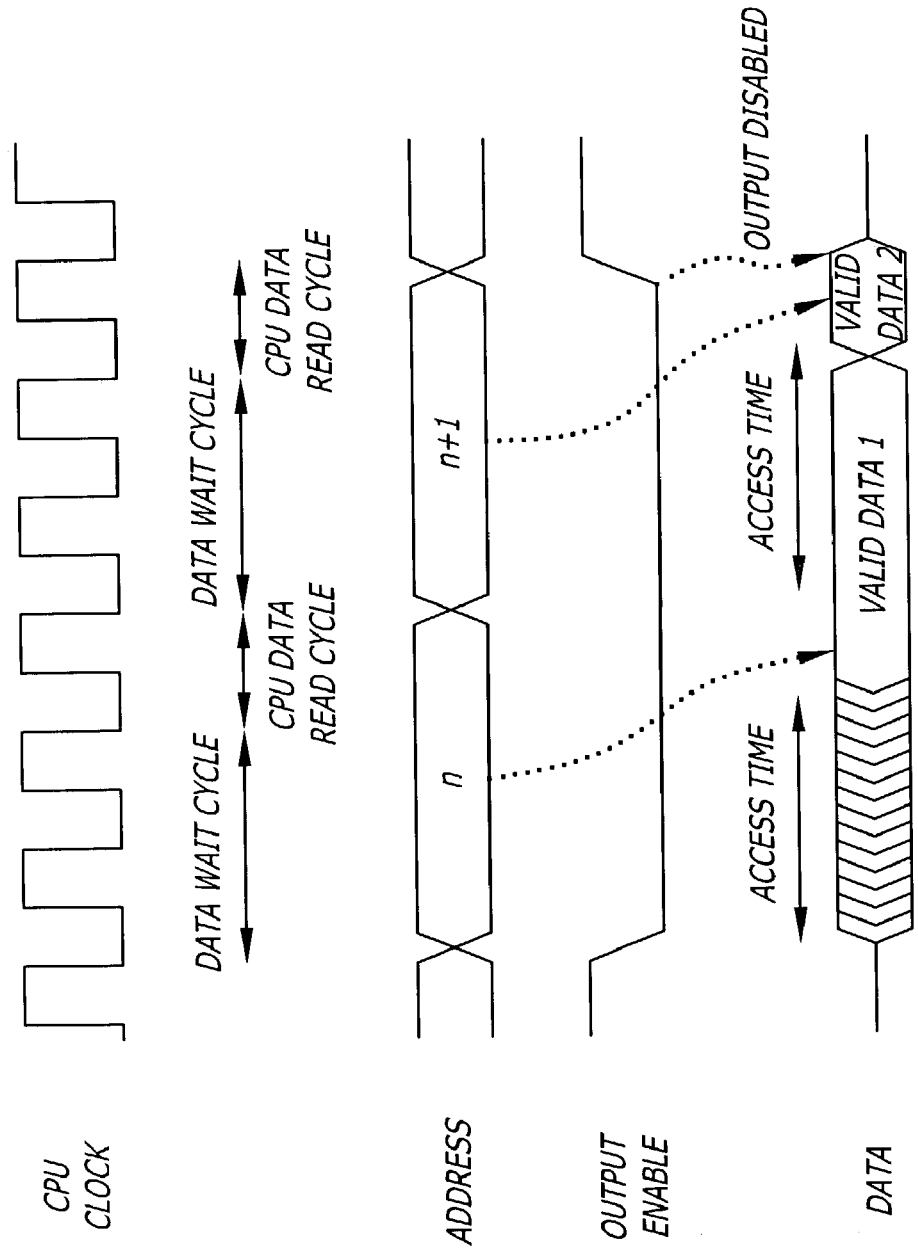
FIG. 2 illustrates an exemplary timing diagram of a memory data read (e.g., with respect to a Flash ROM)

FIG. 2 illustrates an exemplary timing diagram of a memory data read with respect to a Flash ROM (e.g., Flash ROM 140). In this example, the CPU clock rate is three times faster than the Flash ROM access speed. Therefore the CPU needs to wait two more cycles to get data from the Flash ROM because the CPU needs to wait for valid data to come. As a result, a total of three cycles is needed for the CPU to access the Flash memory in this example. If the CPU needs two consecutive Flash ROM accesses, it would take six CPU clock cycles to get the data needed. As shown in FIG. 2, the output enable (OE) signal is generated by the EBIF and provided to the external memory (e.g., Flash ROM 140). The OE signal allows the external memory device such as the Flash ROM to output its data to an external data bus (e.g., external data bus 170 in FIG. 1).

Figure 3:
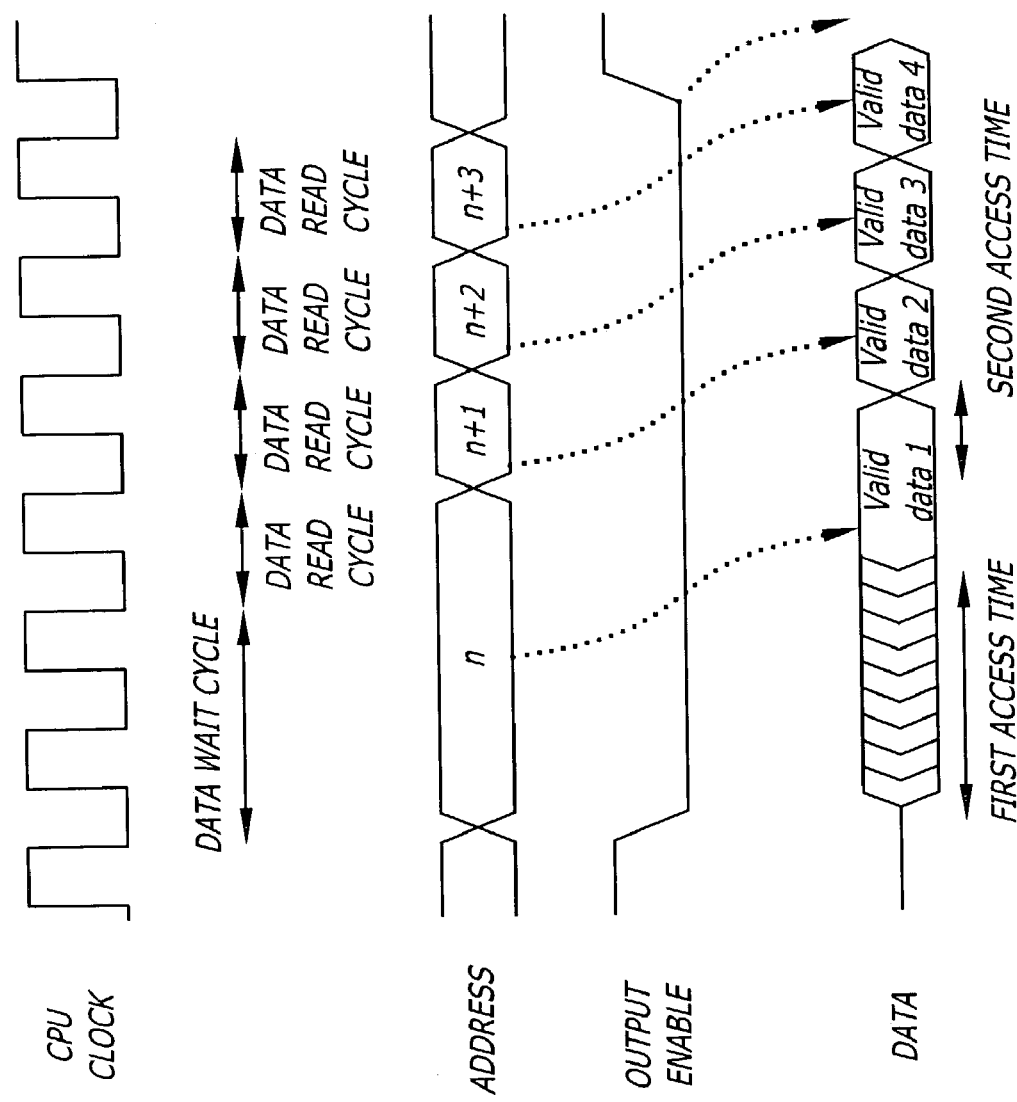
FIG. 3 illustrates an exemplary timing diagram of a memory data read in a burst or page mode (e.g., with respect to a Flash ROM having a burst or page access mode)

FIG. 3 illustrates an exemplary timing diagram of a memory data read in a burst or page mode (e.g., from a Flash ROM having a burst or page access mode). When a memory device such as the Flash ROM 140 has a burst or page mode access, the number of memory access cycles for consecutive data read can be reduced. Certain types of Flash ROM devices are configured to have the burst or page mode access capability. The burst or page mode has the same access speed as the conventional Flash ROM device for the first memory access. However, if the CPU needs consecutive memory accesses, the speed of subsequent accesses are much faster compared to the first access. In the example illustrated in FIG. 3, it takes 3 CPU cycles for the first memory access but it only takes 1 cycle for the second memory access in the burst or page mode. As a result, the burst or page access mode is very efficient for consecutive memory accesses. However, if the CPU does not access the Flash ROM consecutively, the CPU cannot utilize these modes. As described herein, in one embodiment, the present invention provides a mechanism and a method which enable a host device such as a CPU to effectively utilize the burst or page access mode.

Figure 4:
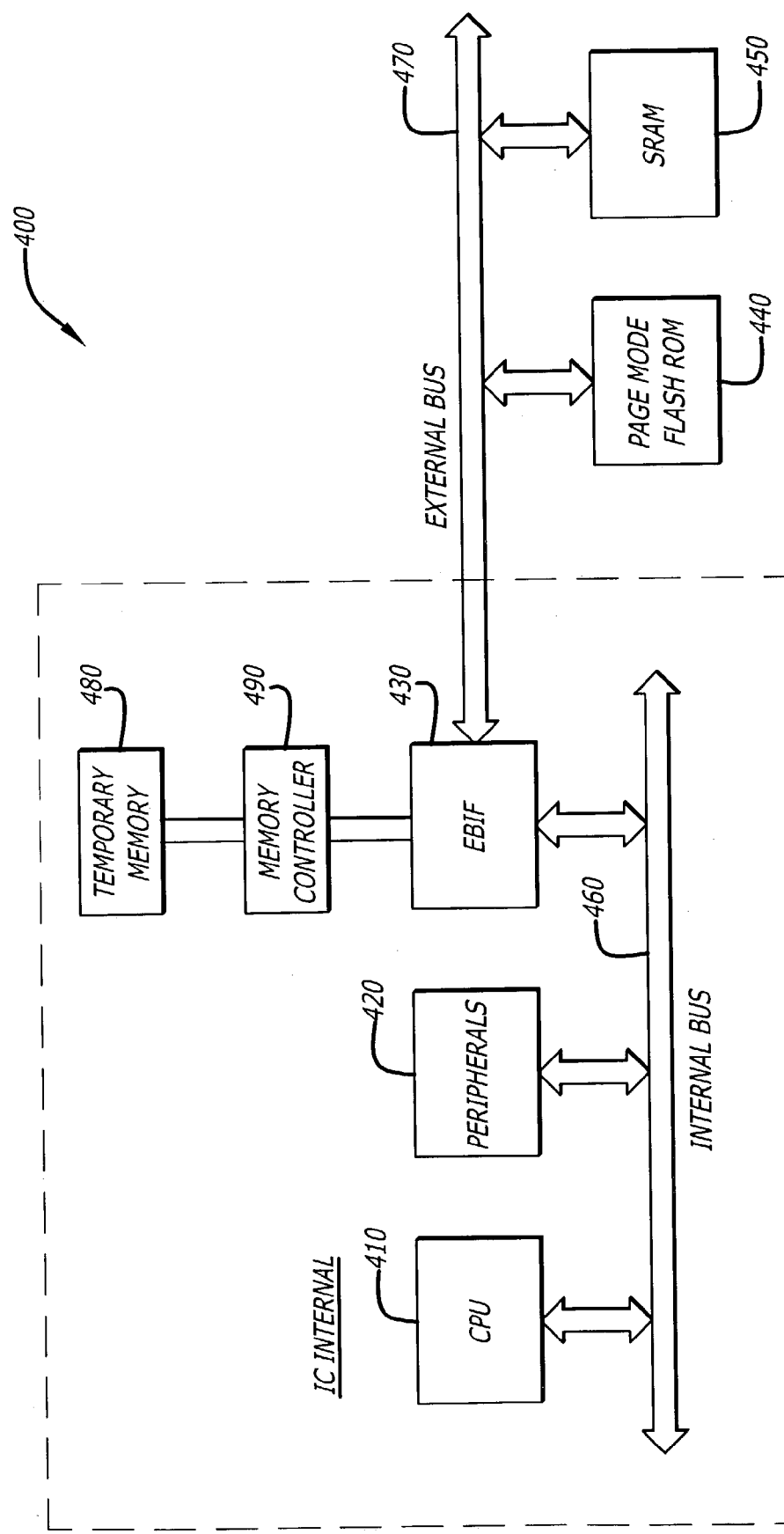
FIG. 4 shows a block diagram of a system according to one embodiment of the invention.

FIG. 4 shows a block diagram of a system 400 according to one embodiment of the invention. As shown in FIG. 4, the system 400 includes a CPU 410, one or more peripheral devices 420, external bus interface (EBIF) unit 430 that are coupled to each other via an internal bus 460. The system 400 further includes one or more Flash ROM devices 440 that are configured to have page or burst access mode and one or more SRAM devices 450. The Flash ROM 440 and SRAM 450 are coupled to the EBIF 430 via external bus 470. As shown in FIG. 4, the system 400 further includes a high speed and small-size temporary memory unit 480 and memory controller 490 which is coupled to the EBIF 430. In one embodiment, the temporary memory unit 480 is a high speed memory which can be accessed by a host device such as CPU 410 with no wait cycles or less wait cycles compared with an external memory device such as the Flash ROM 440. In one embodiment, the size of the temporary memory unit 480 is configured to correspond to the number of consecutive data read size in page or burst access mode (e.g., 4 words to 16 words). The EBIF 430 is described in greater detail below.

Figure 5:
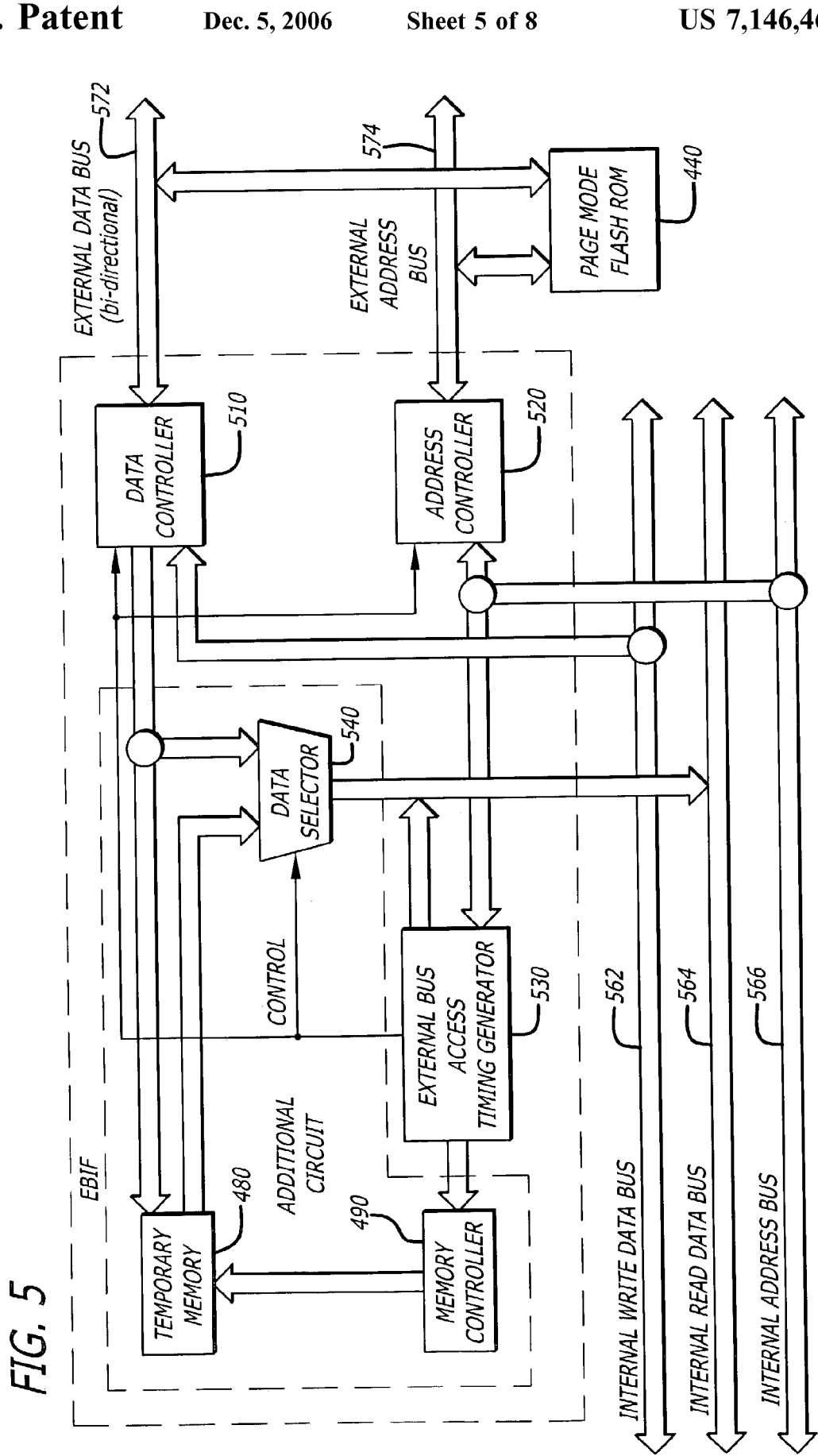
FIG. 5 illustrates a block diagram of an External Bus Interface (EBIF) circuit in accordance with one embodiment of the invention.

FIG. 5 illustrates a block diagram of an External Bus Interface (EBIF) circuit (e.g., EBIF 440 shown in FIG. 4) in accordance with one embodiment of the invention. As shown in FIG. 5, the EBIF 440 includes a data controller 510, an address controller 520, and an external bus access timing generator 530. The data controller 510 is coupled to the Flash ROM 440 via external data bus (bi-directional) 572 and the address controller 520 is coupled to the Flash ROM 440 via external address bus 574. External data bus 572 and external address bus 574 are shown together as external bus 470 in FIG. 4. Timing generator 530 is coupled to the memory controller 490 and data selector 540. In one embodiment, the timing generator 530 is configured to manage and generate external bus access timing signals. Data controller 510 and address controller 520 convert the interface access timing signals between the internal bus 460 and external bus 470. As shown in FIG. 5, the internal bus 460 includes internal write data bus 562, internal read data bus 564, and internal address bus 566. Data selector 540 is coupled to select data from either external data bus 572 via data controller 510 or from temporary memory unit 480 and provide the selected data to internal read data bus 564. The internal write data bus 562 is coupled to data controller 510. Internal address bus 566 is coupled to timing generator 530 and address controller 520.

Figure 6:
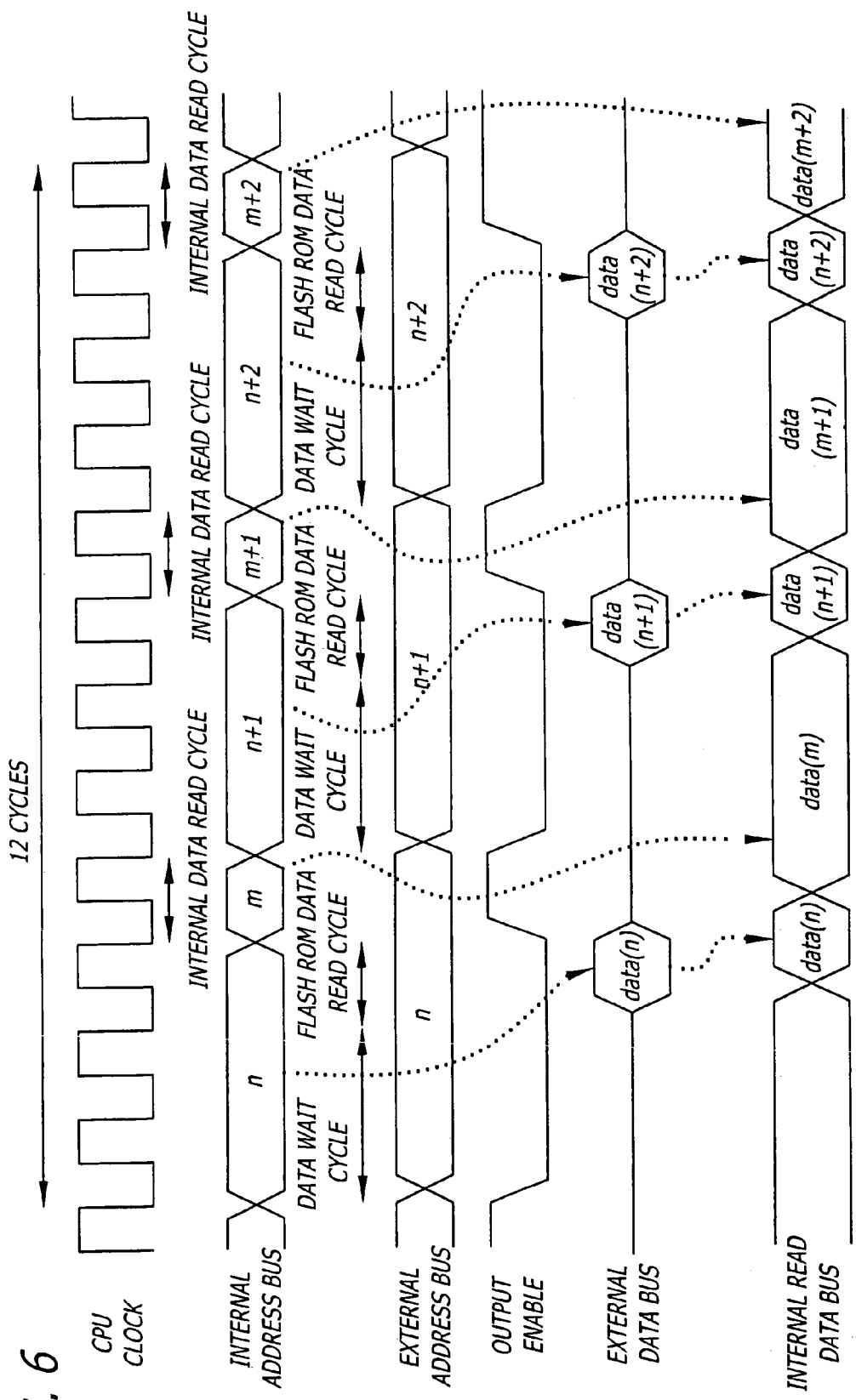
FIG. 6 shows an example of bus read access timing of CPU for a typical CPU system.

FIG. 6 shows an example of bus read access timing of CPU for a typical CPU system (e.g., system 100) without implementing the teachings of the present invention. In this example, as shown in FIG. 6, address range m+i corresponds to the IC internal peripheral address and n+i corresponds external device address (e.g., external memory device address). In this example, it is assumed that the CPU can access internal peripherals without wait cycles. In this example, it can be seen that the CPU accesses external memory and internal peripherals alternately, as illustrated in FIG. 6. Accordingly, the CPU access address is n, m, n+1, m+1, n+2, m+2, and so on. To access addresses n to m+2 in this example, it would take 12 CPU cycles to complete the access operations, assuming 1 cycle for internal peripheral access and 3 cycles for external memory access (3×3=9 cycles for external memory accesses and 1×3=3 cycles for internal peripheral accesses).

Figure 7:
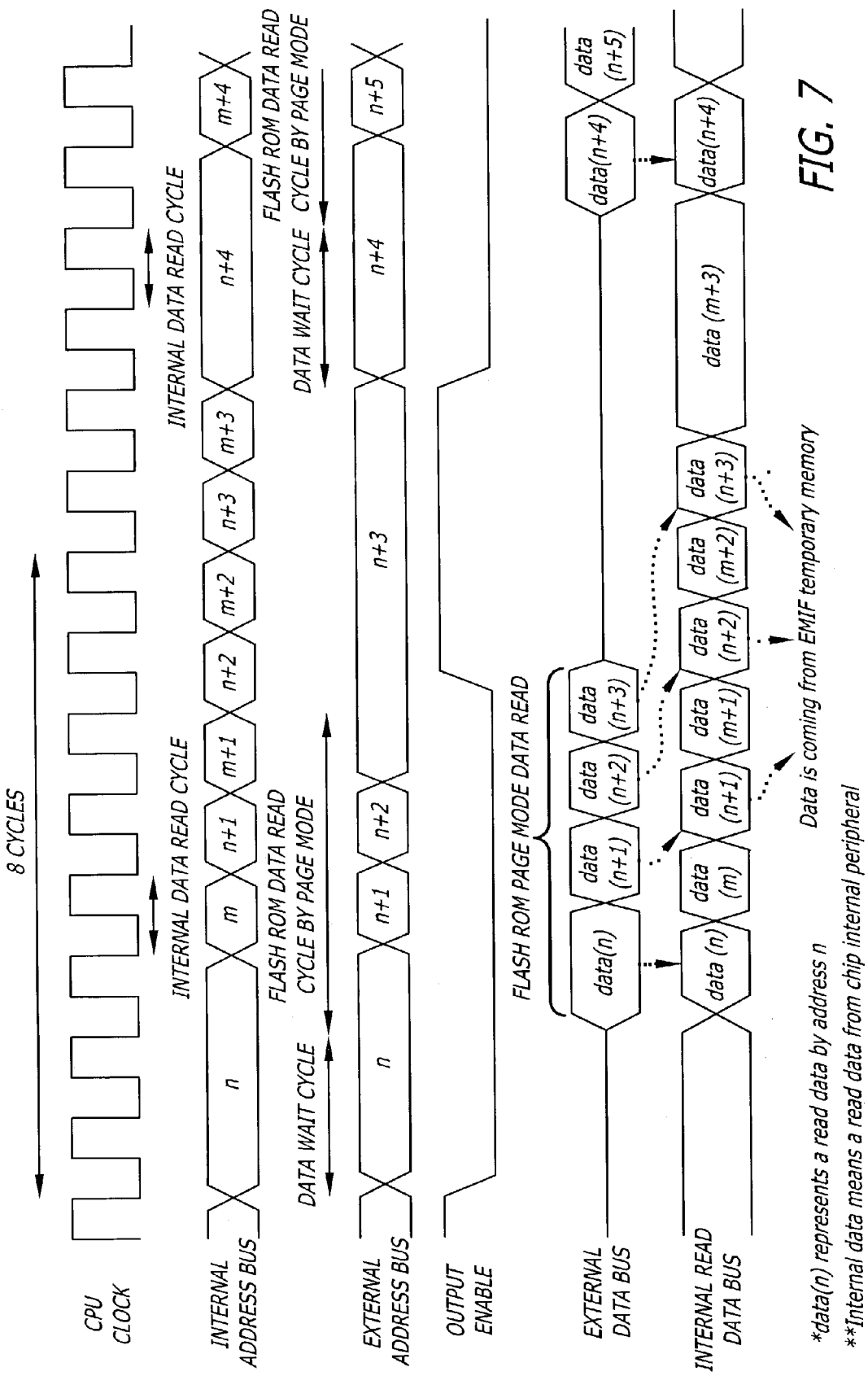
FIG. 7 shows an example of improved bus read access timing of CPU according to one embodiment of the invention.

FIG. 7 shows an example of improved bus read access timing of CPU according to one embodiment of the invention as described above with respect to FIGS. 4 and 5. In this example, as illustrated in FIG. 7, the CPU (e.g., CPU 410) also accesses external memory and internal peripherals alternately. However, since the external Flash memory access speed is improved by the present invention, it takes only 8 CPU cycles to access addresses n to m+2. This is because the data from external memory addresses n, n+1, n+2, and n+3 are read consecutively in one Flash ROM data read cycle by page mode (without data wait cycles incurred with respect to n+1, n+2, and n+3 memory addresses). The data read from external memory addresses n+1, n+2, and n+3 are then stored in the high speed temporary memory unit and sent to the CPU when they are needed. Accordingly, for example, when the CPU issues a memory read request to access data from external memory address n+2, the requested data will be retrieved from the high speed temporary memory unit instead of being fetched from the external Flash ROM device. The external bus access timing generator as shown in FIG. 5 controls the data path between the CPU and the memory units (e.g., the temporary memory unit and the external Flash ROM) and the timing of the EBIF unit depends on the access addresses generated by the CPU. In this embodiment, when the CPU issues a memory read request for external memory address n, the EBIF initiates a Flash ROM data read cycle by page mode which reads data consecutively from external memory addresses n, n+1, n+2, and n+3. The requested data from address n is sent to the CPU at this point. Data from external memory addresses n+1, n+2, and n+3 are stored in the high speed temporary memory unit since they are not needed by the CPU at this point. Subsequently, when the CPU issues memory read requests for external memory addresses n+1, n+2, and n+3, the requested data are retrieved from the high speed temporary memory unit for the CPU instead of being fetched from the external Flash ROM. As such, the memory access efficiency is significantly improved because the data stored in the high speed temporary memory unit can be accessed much faster by the CPU compared to the Flash ROM access time. In this configuration according to one embodiment of the invention, the fast access speed in burst or page mode can be efficiently and effectively utilized even when the CPU does not access the Flash ROM consecutively.

Figure 8:
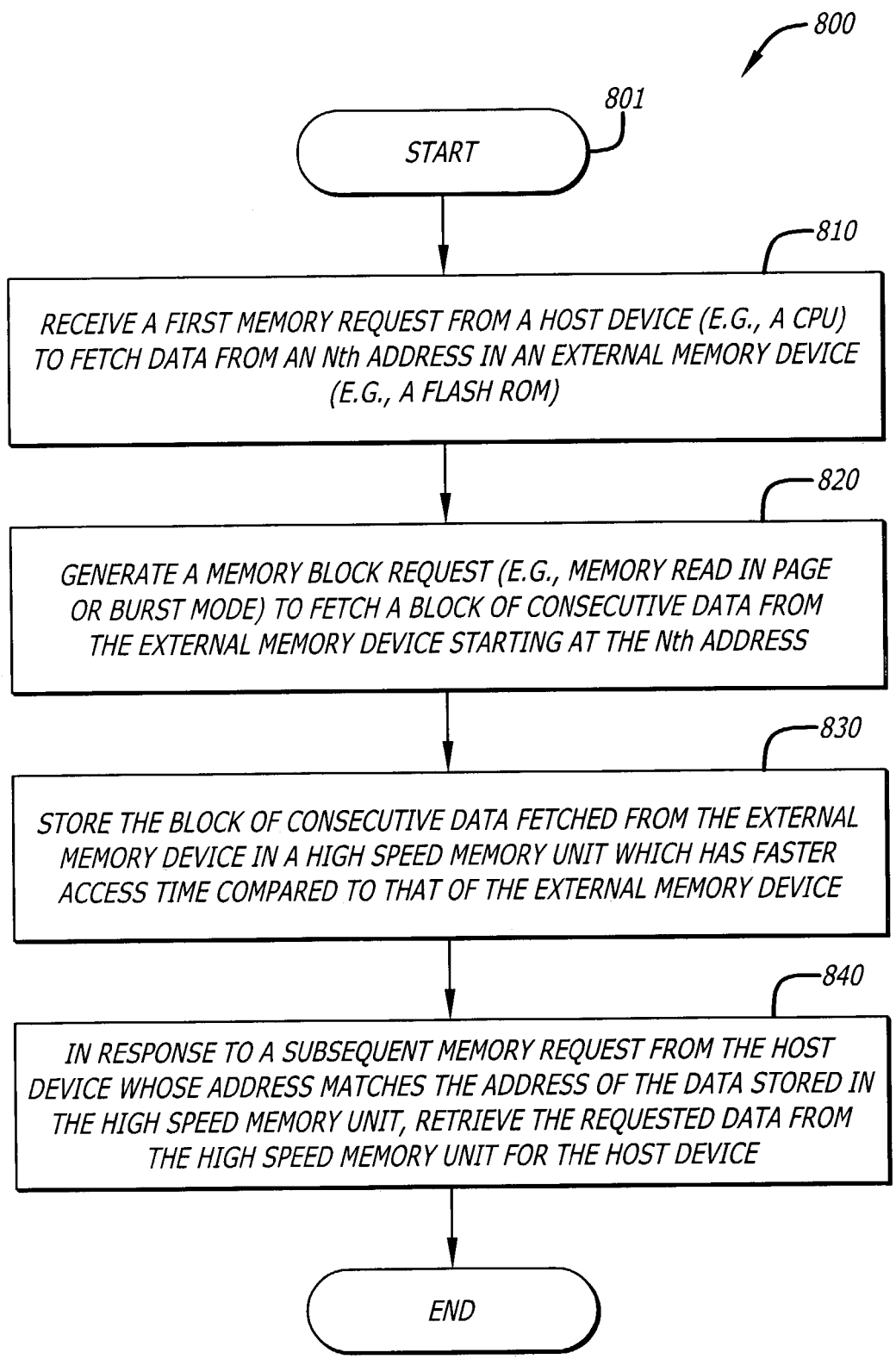
FIG. 8 shows a flow diagram of a method according to one embodiment of the invention.

FIG. 8 shows a flow diagram of a method according to one embodiment of the invention. At block 810, a first memory request is received from a host device (e.g., CPU 410) to fetch data from an nth address in an external memory device (e.g., Flash ROM 440). At block 820, a memory block request (e.g., memory read in page or burst mode) is generated to fetch a block of consecutive data from the external memory device starting at the nth address (nth, n+1th, n+2th, n+3th, etc.). At block 830, the block of consecutive data fetched from the external memory device is stored in a high speed memory unit which has faster access time compared to that of the external memory device. At block 840, in response to a subsequent memory request from the host device to fetch data whose address matches the address of the data stored in the high speed memory unit, the requested data is retrieved from the high speed memory unit for the host device instead of being fetched from the external memory device.

While the invention has been described in terms of several embodiments, those of ordinary skill in the art will recognize that the invention is not limited to the embodiments described herein. It is evident that numerous alternatives, modifications, variations and uses will be apparent to those of ordinary skill in the art in light of the foregoing description.

What is claimed is:

1. An apparatus comprising:
   a high speed memory unit to store data received from an external memory device, the high speed memory unit having faster memory access speed compared to the external memory device;
   a memory controller coupled to the high speed memory unit to control access to the high speed memory unit; and
   an external bus interface (EBIF) unit coupled to the memory controller and adapted to receive data from the external memory device and to transfer the data received from the external memory device to the high speed memory unit, the EBIF unit, based on a memory request issued by a host device to read a block of data from the external memory device, (i) initiates a burst or page mode read cycle even when memory requests by the host device immediately subsequent to the memory request are not directed to the external memory device, (ii) stores at least a portion of the block of data read in the high speed memory unit in response to the burst or page mode read cycle, and (iii) retrieves requested data from the high speed memory unit in response to subsequent memory requests issued by the host device for data already stored within die high speed memory unit.

2. The apparatus of claim 1 wherein die EBIF unit comprises:
   a data controller coupled to the external memory device, the data controller to transmit data to and receive data from the external memory device;
   an address controller coupled to the external memory device, the address controller to communicate addresses of memory access requests with the external memory device;
   a timing generator coupled to the address controller and the memory controller, the timing generator to control external bus access timing via the address controller and the high speed memory unit access timing via the memory controller; and
   a data selector to select either data from the external memory device or data from the high speed memory unit based on a control signal generated from the timing generator, in response to a memory read request issued by the host device.

3. The apparatus of claim 2 wherein the external memory device, when operated in a page access mode or burst access mode for consecutive data read, reduces memory access time for subsequent memory accesses included in the page mode memory request or burst mode memory request.

4. The apparatus of claim 2 wherein the host device is a central processing unit (CPU) and the external memory device is a flash read-only-memory (ROM) device capable of operating in a page mode access or a burst mode access.

5. The apparatus of claim 4 wherein the size of the high speed memory unit corresponds to a number of consecutive data read size in the page access mode.

6. The apparatus of claim 4 wherein the size of the high speed memory unit corresponds to a number of consecutive data read size in the burst access mode.

7. The apparatus of claim 2 wherein the timing generator is adapted to receive an address associated with the subsequent, non-consecutive memory request issued by the host device and to determine whether the respective address matches one of the addresses of the data stored in the high speed memory unit.

8. The apparatus of claim 7 wherein, if there is a match, the timing generator generates the control signal to the data selector to select the requested data from the high speed memory unit.

9. The apparatus of claim 7 wherein, if there is no match, the timing generator generates corresponding access signals via the address controller and the data controller to fetch a block of consecutive data from the external memory device starting at the respective address associated with the subsequent, non-consecutive memory request.

10. The apparatus of claim 9 wherein the data fetched from the external memory device is stored in the high speed memory unit via the data controller.

11. A method comprising:
    receiving a first memory request from a host device to fetch data from an address in an external memory device;
    in response to the first memory request, generating a memory block request to fetch a block of consecutive data starting at the address despite a second memory request, immediately following the first memory request, is associated with fetching data from a memory other than the external memory device;
    storing at least a portion of the block of data fetched from the external memory device in a high speed memory unit, the high speed memory unit having a faster access time than the external memory device; and
    in response to a third memory request from the host device to fetch data from the external memory device, retrieving the requested data from the high speed memory unit for the host device when the requested data is stored at an address that matches an address of data stored in the high speed memory unit.

12. The method of claim 11 wherein the host device is a central processing unit (CPU) and the external memory device is a flash read-only-memory (ROM) device capable of operating in a page mode access or a burst mode access.

13. The method of claim 12 wherein the memory block request is a memory read command to access the flash ROM device in the page mode to fetch the block of data being a block of consecutive data words from the flash ROM device.

14. The method of claim 13 wherein the size of the high speed memory unit corresponds to the size of the block of consecutive data words.

15. The method of claim 12 wherein the memory block request is a memory read command to access the flash ROM device in burst mode to fetch the block of data being a block of consecutive data words from the flash ROM device.

16. The method of claim 11 further including:
    determining whether the address associated with the third memory request issued by the host device matches an address of data stored in the high speed memory unit;

if the address associated with the third memory request does not match, fetching a block of consecutive data from the external memory device based on the address associated with the third memory request; and if the address associated with the third memory request matches, retrieving the requested data from the high speed memory unit.

17. A system comprising:

a processor;

one or more peripheral devices coupled to the processor via an internal bus;

an external bus interface (EBIF) unit coupled to the processor via the internal bus to facilitate data transfer between the processor and other devices in the system;

a high speed memory unit coupled to the EBIF unit via a memory controller, the high speed memory unit to store data fetched from an external memory device via the EBIF unit, wherein the EBIF unit, based on a memory request issued by the processor, generates a consecutive data read request to read a block of data from the external memory device even when a subsequent memory request immediately following the memory request is not directed to a memory access of the external memory device arid to store at least a portion of the block of data read in the high speed memory unit, and wherein the EBIF unit, in response to the subsequent memory request issued by the processor that is directed to a requested data of the block of data within the high speed memory unit, retrieves the requested data for the processor from the high speed memory unit instead of the external memory device.

18. The system of claim 17 wherein the external bus interface unit comprises:

a data controller coupled to the external memory device via an external data bus, the data controller to transmit data to and receive data from the external memory device via the external data bus;

an address controller coupled to the external memory device via an external address bus, the address control to communicate addresses of memory access requests with the external memory device via the external address bus;

a timing generator coupled to the address controller and the memory controller, the timing generator to control external bus access timing via the address controlled and the high speed memory unit access timing via the memory controller; and a data selector to select either data from the external memory device or data from the high speed memory unit based on a control signal generated from the external access bus timing generator, in response to a memory read request issued by the host device.

19. The system of claim 18 wherein the external memory device is a flash read-only-memory (ROM) device that is capable of operating in a page mode or a burst mode.

20. The system of claim 19 wherein the size of the high speed memory unit is configured to correspond to the size of the consecutive data read request.

21. A machine-readable medium comprising instructions which, when executed by a machine, cause the machine to perform operations including:

receiving a first memory request from a host device to fetch data from an address in an external memory device;

generating a memory block request to fetch a block of consecutive data starting at the address even when the host device fails to access the external memory device using consecutive memory requests so that a memory request immediately following the first memory request is not directed to fetching data from the external memory device;

storing the block of data fetched from the external memory device in a high speed memory unit, the high speed memory unit having a faster access dine than the external memory device; and in response to a second memory request from the host device to fetch requested data whose address matches an address of data stored in the high speed memory unit and the second memory request is subsequent to but not immediately following the first memory request, retrieving the requested data from the high speed memory unit for the host device instead of fetching the requested data from the external memory device.

22. The machine-readable medium of claim 21 wherein the host device is a central processing unit (CPU) and the external memory device is a flash read-only-memory (ROM) device capable of operating in a page mode access or a burst mode access.

* * * * *